US009638902B2

(12) United States Patent
Nagatoshi

(10) Patent No.: US 9,638,902 B2
(45) Date of Patent: *May 2, 2017

(54) PROJECTION ZOOM LENS AND PROJECTION TYPE DISPLAY DEVICE

(71) Applicant: FUJIFILM Corporation, Tokyo (JP)

(72) Inventor: Yukiko Nagatoshi, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 88 days.

This patent is subject to a terminal disclaimer.

(21) Appl. No.: 14/713,465

(22) Filed: May 15, 2015

(65) Prior Publication Data

US 2015/0247997 A1 Sep. 3, 2015

Related U.S. Application Data

(63) Continuation of application No. PCT/JP2013/006718, filed on Nov. 15, 2013.

(30) Foreign Application Priority Data

Nov. 19, 2012 (JP) ................................ 2012-253318

(51) Int. Cl.
 *G02B 15/14* (2006.01)
 *G02B 15/17* (2006.01)
 (Continued)

(52) U.S. Cl.
 CPC ............. *G02B 15/17* (2013.01); *G02B 13/16* (2013.01); *G02B 15/173* (2013.01); *G02B 5/005* (2013.01);
 (Continued)

(58) Field of Classification Search
 CPC ...... G02B 13/0045; G02B 9/60; G02B 5/005; G02B 13/04; G02B 13/002; G02B 13/009; G02B 15/177; G02B 15/20
 (Continued)

(56) References Cited

U.S. PATENT DOCUMENTS 5,917,658 A 6/1999 Yamanashi
7,079,324 B2* 7/2006 Yamasaki ............ G02B 15/177
 359/680
(Continued)

FOREIGN PATENT DOCUMENTS

JP 08-234105 9/1996
JP 2003-202497 7/2003
(Continued)

OTHER PUBLICATIONS

International Search Report, PCT/JP2013/006718, Mar. 18, 2014.

*Primary Examiner* — Evelyn A Lester
(74) *Attorney, Agent, or Firm* — Young & Thompson

(57) ABSTRACT

The projection zoom lens essentially consists of a positive first lens group fixed while changing magnification and the second lens group through the fourth lens group which move while changing magnification, and a fifth lens group fixed while changing magnification; and an aperture stop positioned between adjacent moving lens groups or within one moving lens group, wherein
the numerical number of the zoom lens is set to be constant over the entire zoom range,
the reduction side is configured to be telecentric, and
the projection zoom lens satisfies conditional formulas (4) and (5):

$$2.0 < Bf/Im\phi \quad (4)$$

$$L/Im\phi < 12 \quad (5),$$

where,
Bf: the back focus (air converted length) at the reduction side of the entire system at the wide angle end,
Im$\phi$: the maximum effective image circle diameter, and
(Continued)

L: the distance between the most-magnification-side lens surface and the most-reduction-side lens surface along the optical axis when the projection distance is infinite.

20 Claims, 10 Drawing Sheets

(51) Int. Cl.
| | | |
|---|---|---|
| G02B 15/173 | (2006.01) | |
| G02B 13/16 | (2006.01) | |
| G02B 9/60 | (2006.01) | |
| G02B 13/00 | (2006.01) | |
| G02B 13/04 | (2006.01) | |
| G02B 5/00 | (2006.01) | |
| G02B 15/20 | (2006.01) | |
| G02B 15/177 | (2006.01) | |

(52) U.S. Cl.
CPC ............. *G02B 9/60* (2013.01); *G02B 13/002* (2013.01); *G02B 13/009* (2013.01); *G02B 13/0045* (2013.01); *G02B 13/04* (2013.01); *G02B 15/177* (2013.01); *G02B 15/20* (2013.01)

(58) Field of Classification Search
USPC ....... 359/649, 680, 683–685, 676, 714, 740, 359/765, 770
See application file for complete search history.

(56) References Cited

U.S. PATENT DOCUMENTS

| | | | | |
|---|---|---|---|---|
| 7,190,528 | B2* | 3/2007 | Inoko ................... | G02B 15/177 359/649 |
| 7,295,378 | B2* | 11/2007 | Hakko ................. | G02B 15/163 359/649 |
| 7,605,985 | B2* | 10/2009 | Nagahara ............. | G02B 15/177 359/680 |
| 8,072,690 | B2* | 12/2011 | Nagatoshi ............ | G02B 15/177 359/682 |
| 8,081,391 | B1* | 12/2011 | Kawana ............... | G02B 15/177 359/680 |
| 8,976,455 | B2* | 3/2015 | Nagahara ............. | G02B 15/177 359/649 |
| 2009/0135496 | A1 | 5/2009 | Nagahara et al. | |
| 2011/0051257 | A1 | 3/2011 | Wada et al. | |
| 2011/0090373 | A1 | 4/2011 | Wakazono | |
| 2011/0317279 | A1 | 12/2011 | Takahashi | |
| 2013/0201565 | A1 | 8/2013 | Yamanaka | |
| 2014/0049672 | A1 | 2/2014 | Sakamoto | |

FOREIGN PATENT DOCUMENTS

| | | |
|---|---|---|
| JP | 2003-241095 | 8/2003 |
| JP | 2003-241096 | 8/2003 |
| JP | 2009-128683 | 6/2009 |
| JP | 2011053295 | 3/2011 |
| JP | 2011-107693 | 6/2011 |
| JP | 2012-008344 | 1/2012 |
| JP | 2012-058607 | 3/2012 |
| JP | 2013-160997 | 8/2013 |
| JP | 2014-038237 | 2/2014 |

* cited by examiner

FIG.6
EXAMPLE 2
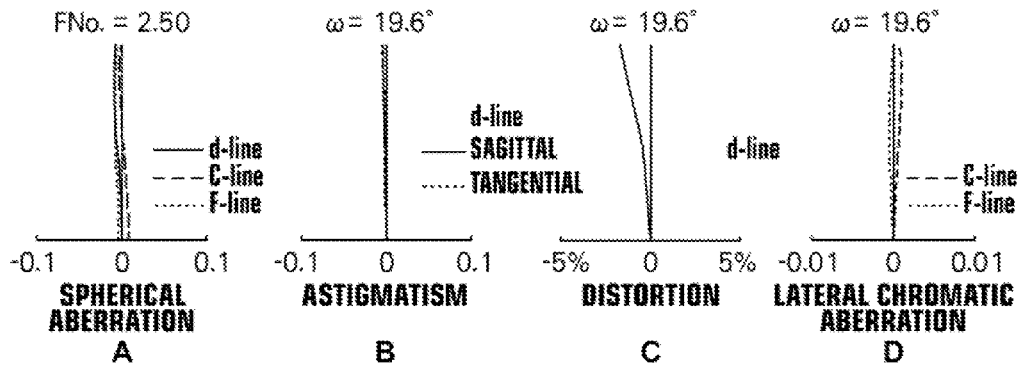
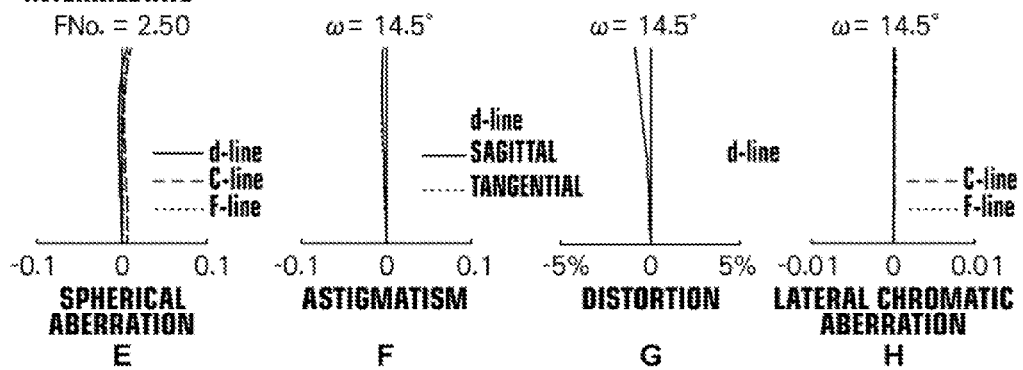
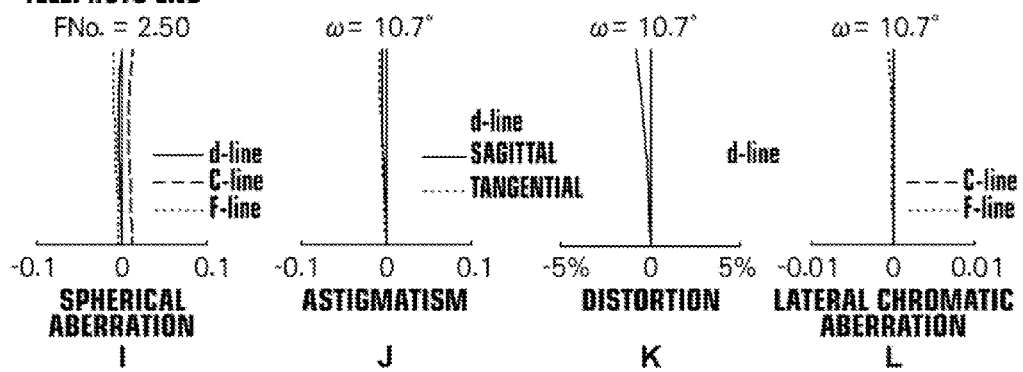

PROJECTION ZOOM LENS AND PROJECTION TYPE DISPLAY DEVICE

CROSS-REFERENCE TO RELATED APPLICATIONS

This application is a Continuation of PCT International Application No. PCT/JP2013/006718 filed on Nov. 15, 2013, which claims priority under 35 U.S.C. §119(a) to Japanese Patent Application No. 2012-253318 filed on Nov. 19, 2012. Each of the above application(s) is hereby expressly incorporated by reference, in its entirety, into the present application.

BACKGROUND OF THE INVENTION

Field of the Invention

The present invention relates to a zoom lens, and particularly to a projection zoom lens to be applied to a projection type display device.

Further, the present invention relates to a projection type display device equipped with such a projection zoom lens.

Description of the Related Art

Conventionally, projection type display devices that utilize light valves, such as liquid crystal display elements, DMD's (Digital Micromirror Device: registered trademark), or the like have been widespread. Further, in recent years, movie theaters and the like have been using such projection type display devices, which are designed to be capable of being applied to large screens and of producing high-definition images.

Such projection type display devices to be utilized in movie theaters and the like as described above have been required to have long back focus and a favorable telecentricity. This is because such projection type display devices adopt a three-plate system in which three light valves for the respective primary colors are provided. In the three-plate system, a light beam from the light source is divided into three primary colors by a color separation optical system, and the separated light of the three colors passes through the respective light valves and then is composed by a color composition optical system to be projected.

Further, such projection type display devices to be utilized in movie theaters and the like have been required to be equipped with high zoom-ratio zoom lenses as a projection lens. This aims at fitting the size of display images to a screen size in accordance with the projector distances and screen sizes, which differ depending on movie theaters, halls, and in accordance with aspect ratios (cinema scope, Vista size) of display images.

Further, there are many cases that such projection zoom lenses are required to maintain constant numerical apertures (hereinafter, referred to as "F number(s)" as well) over the entire zoom range. This is because operating in such a manner can prevent the brightness of display images from changing when the zoom ratios of this type of zoom lens are changed to match the sizes described above.

Further, accompanying the rapid pace of digitalization of cinema screens, projection type display devices have been rapidly miniaturized and reduced in cost. There is also likely to be demand for projection zoom lenses to be miniaturized and reduced in cost in addition to the demands for back focus, telecentricity, and high zoom ratio.

Patent Documents 1 and 2 (Japanese Unexamined Patent Publication No. 2009-128683 and Japanese Unexamined Patent Publication No. 2012-058607) disclose projection zoom lenses which are configured to maintain the numerical apertures constant over the entire zoom ranges.

SUMMARY OF THE INVENTION

However, in the projection zoom lenses disclosed in Patent Documents 1 and 2, lens groups positioned at the magnification side of an aperture stop is caused to move, and the aperture stop and lens groups positioned at the reduction side thereof are fixed so as to maintain the numerical apertures constant, and the like. In such projection zoom lenses, the total length of the zoom lens and the diameters of lenses within the most-magnification-side lens group will increase when high zoom ratios are achieved. As such, such projection zoom lenses cannot satisfy the demand for miniaturization. Further, the demand for reduction in costs cannot be satisfied as well because the increase in the total length and the diameters of the lenses leads to cost increases in optical systems.

The present invention has been developed in view of the above circumstances. It is an object of the present invention to provide a projection zoom lens and a projection type display device which can maintain a constant numerical aperture over the entire zoom range and reduce the total length and the diameters of lenses within the most-magnification-side lens group.

A projection zoom lens according to the present invention essentially consisting of:

a first lens group having a positive refractive power positioned at the most-magnification side and fixed while changing magnification;

at least two moving lens groups positioned at the reduction side of the first lens group, the moving lens groups moving while changing magnification; and an aperture stop positioned between adjacent moving lens groups or within one moving lens group, wherein the numerical number of the zoom lens is set to be constant over the entire zoom range, and the reduction side is configured to be telecentric.

Note that the above expression "positioned . . . within one moving lens group" means not only that the aperture stop is positioned between the most-magnification-side lens and the most-reduction-side lens, but also that the aperture stop is positioned at the magnification side of the most-magnification-side lens or at the reduction side of the most-reduction-side lens.

The above expression "the reduction side is . . . telecentric" refers to a state in which a line bisecting the angle formed by a ray having a maximum height in the upper side and a ray having a maximum height in the bottom side is nearly parallel to the optical axis in a cross section of a light beam which is focused on an arbitrary point on an image surface at the reduction side. The above expression is not limited to a case that the reduction side is completely telecentric, that is, the line bisecting the angle is completely parallel to the optical axis, but also refers to cases in which a certain degree of error is present. Here, the certain degree of error refers to a range of inclination between the bisecting angular line and the optical axis of ±3°.

It is desirable for the projection zoom lens of the present invention to satisfy conditional formula (1) below when the amount of movement between the wide angle end and the telephoto end of the most-reduction-side moving lens group is mr and the focal length of the entire system at the wide angle end is fw:

$$0.3 < mr/fw \qquad (1).$$

Note that it is more desirable for the condition defined by conditional formula (1) to satisfy conditional formula (1') below:

$$0.5 < mr/fw \quad (1').$$

Further, it is desirable for the projection zoom lens of the present invention, in which a final lens group positioned at the most-reduction side has a positive refractive power and is fixed while changing magnification, to satisfy conditional formula (2) below when the focal length of the final lens group is fe and the focal length of the entire system at the wide angle end is fw:

$$2.0 < fe/fw < 7.0 \quad (2).$$

It is more desirable for the condition defined by conditional formula (2) to satisfy conditional formula (2') below:

$$3.0 < fe/fw < 5.0 \quad (2').$$

Further, it is desirable for the projection zoom lens of the present invention to essentially consist of a first lens group having a positive refractive power, positioned at the most-magnification side and fixed while changing magnification; a final lens group having a positive refractive power, positioned at the most-reduction side and fixed while changing magnification; and a plurality of lens groups that move while changing magnification, positioned between the first lens group and the final lens group, as described above, wherein the most-magnification-side lens group has a negative refractive power and the most-reduction-side lens group has a positive refractive power among the plurality of lens groups that move while changing magnification, and conditional formula (3) below is satisfied when the amount of movement between the wide angle end and the telephoto end of the most-magnification-side moving lens group is mm and the amount of movement between the wide angle end and the telephoto end of the most-reduction-side moving lens group is mr:

$$-1.0 < mm/mr < -0.2 \quad (3).$$

Note that it is more desirable for the condition defined by conditional formula (3) to satisfy conditional formula below:

$$-0.7 < mm/mr < -0.3 \quad (3').$$

It is desirable for the aperture stop to vary the aperture diameter (stop diameter) such that the numerical number is constant over the entire zoom range in the projection zoom lens of the present invention.

It is desirable for the projection zoom lens of the present invention to satisfy conditional formulas (4) and (5) below when the back focus (air converted length) of the entire system at the reduction side at the wide angle end is Bf, the maximum effective image circle diameter (image circle diameter) is Imφ, and the distance between the most-magnification-side lens surface and the most-reduction-side lens surface along the optical axis when the projection distance is infinite is L:

$$2.0 < Bf/Im\phi \quad (4)$$

$$L/Im\phi < 12 \quad (5).$$

Note that it is more desirable for the condition defined by conditional formula (4) to satisfy conditional formula below:

$$2.5 < Bf/Im\phi \quad (4').$$

Further, it is more desirable for the condition defined by conditional formula (5) to satisfy conditional formula below:

$$7 < L/Im\phi < 11 \quad (5').$$

Further, it is desirable for the projection zoom lens of the present invention to satisfy conditional formula (6) below when the focal length of the first lens group is f1 and the focal length of the entire system at the wide angle end is fw:

$$1.0 < f1/fw < 5.0 \quad (6).$$

Note that it is more desirable for the condition defined by conditional formula (6) to satisfy conditional formula below:

$$2.0 < f1/fw < 4.0 \quad (6').$$

Further, it is desirable for the projection zoom lens of the present invention to essentially consist of the first lens group, a second lens group having a negative refractive power that moves while changing magnification, a third lens group having a negative refractive power that moves while changing magnification, a fourth lens group having a positive refractive power that move while changing magnification, and a fifth lens group having a positive refractive power that is fixed while changing magnification in this order from the magnification side.

Further, it is desirable for the projection zoom lens of the present invention to satisfy conditional formula (7) below when the zoom ratio of the telephoto end with respect to the wide angle end is Zr:

$$1.4 < Zr \quad (7).$$

Further, it is more desirable for the condition defined by conditional formula (7) to satisfy conditional formula (7') below:

$$1.6 < Zr \quad (7').$$

Note that the lenses which constitute each lens group may be cemented lenses in the projection zoom lenses of the present invention. A cemented lens, which is constituted by bonding n numbers of lenses together, will be counted as n lenses.

The projection type display device according to the present invention includes a light source, a light valve into which light from the light source enters, and a projection zoom lens which projects an optical image formed by the light optically modulated by the light valve onto a screen. The projection zoom lens according to the present invention described above is applied as such a projection zoom lens.

The projection zoom lens of the present invention essentially consists of a first lens group having a positive refractive power positioned at the most-magnification side that is fixed while changing magnification, at least two moving groups that are positioned at the reduction side of the first lens group and move while changing magnification; and an aperture stop positioned between adjacent moving lens groups or within one moving lens group. Further, the projection zoom lens is configured to maintain the numerical aperture constant over the entire range. This enables the total length of the zoom lens and the diameters of lenses within the most-magnification-side lens group to become shorter than those of the projection zoom lens disclosed in Patent Document 1 in which both the most-reduction-side lens group and the aperture stop positioned at the magnification side thereof are fixed while changing magnification to maintain the numerical aperture constant. Thereby, the projection zoom lens of the present invention can prevent restrictions on installation from becoming severe and costs from increasing.

In the case that the projection zoom lens, particularly in which conditional formula (1) described above is satisfied, the advantageous effects such that the total length of the zoom lens and the diameters of lenses can be decreased further can be obtained:

$$0.3 < mr/fw \quad (1).$$

The advantageous effects described above will become more prominent in the case that conditional formula below is satisfied within the range defined by conditional formula (1):

$$0.5 < mr/fw \quad (1').$$

In the case that the projection zoom lens, particularly in which the final lens group having a positive refractive power positioned at the most-reduction side is fixed while changing magnification, satisfies conditional formula (2) described above when the focal length of the final lens group is fe and the focal length of the entire system at the wide angle end is fw, the advantageous effects below can be obtained:

$$2.0 < fe/fw < 7.0 \quad (2).$$

That is, when the value of fe/fw becomes less than or equal to 2.0, it will be difficult to correct spherical aberration. Further, the diameters of the magnification-side lenses will increase, and the zoom lens thereby will enlarge. When the value of fe/fw exceeds 2.0, such a problem will be avoided so that spherical aberration can be corrected favorably. In addition, the diameters of the magnification-side lenses can be reduced and the zoom lens thereby can be formed in a small size.

Further, when the value of fe/fw becomes greater than or equal to 7.0, spherical aberration at the telephoto end will be likely to become large. In contrast, when the value of fe/fw falls below 7.0, such a problem will be avoided so that spherical aberration at the telephoto end can be reduced.

The advantageous effects described above will become more prominent in the case that conditional formula (2') is satisfied within the range defined by conditional formula (2).

$$3.0 < fe/fw < 5.0 \quad (2').$$

The projection zoom lens of the present invention essentially consists of a first lens group having a positive refractive power, positioned at the most-magnification side and fixed while changing magnification, a final lens group having a positive refractive power that is disposed at the most-reduction side and fixed while changing magnification and a plurality of lens groups positioned between the first lens group and the final lens group that move while changing magnification; wherein the most-magnification-side lens group has a negative refractive power and the most-reduction-side lens group has a positive refractive power among the plurality of lens groups that move while changing magnification, the conditional formula (3) below is satisfied when the amount of movement between the wide angle end and the telephoto end of the most-magnification-side moving lens group is mm and the amount of movement between the wide angle end and the telephoto end of the most-reduction-side moving lens group is mr:

$$-1.0 < mm/mr < -0.2 \quad (3).$$

In such a case, the advantageous effects below can be obtained.

That is, when the value of mm/mr becomes less than or equal to −1.0, the fluctuations in lateral chromatic aberration while changing magnification will increase. However, when the value of mm/mr exceeds −1.0, such a problem will be avoided such that the fluctuations in lateral chromatic aberration while changing magnification can be reduced.

Further, when the value of mm/mr becomes greater than or equal to −0.2, the fluctuations in field curvature while changing magnification will become large. When the value of mm/mr falls below −0.2, such a problem can be avoided so that the fluctuations in field curvature while changing magnification can be reduced.

The advantageous effects described above will become more prominent in the case that conditional formula (3') below is satisfied within the range defined by conditional formula (3):

$$-0.7 < mm/mr < -0.3 \quad (3).$$

Particularly in the case that an aperture stop, which varies the aperture diameter in such a manner that the numeral aperture become constant over the entire zoom range while changing magnification, is used in the projection zoom lens of the present invention, a higher zoom ratio can be achieved.

Further, the advantageous effects below can be obtained particularly in the case that the projection zoom lens of the present invention satisfies conditional formulas (4) and (5) described above when the back focus (air converted length) at the reduction side of the entire system at the wide angle end is Bf, the maximum effective image circle diameter (image circle diameter) is Im$\phi$, and the distance between the most-magnification-side lens surface and the most-reduction-side lens surface along the optical axis when the projection distance is infinite is L:

$$2.0 < Bf/Im\phi \quad (4)$$

$$L/Im\phi < 12 \quad (5).$$

That is, the value of Bf/Im$\phi$ becomes less than or equal to 2.0, the back focus will become short. As a result, it becomes difficult to dispose the prism within the lens system. When the value of Bf/Im$\phi$ exceeds 2.0, such a prism can be easily disposed therein.

The advantageous effects described above will become more prominent in the case that conditional formula (4') is satisfied within the range defined by conditional formula (4):

$$2.5 < Bf/Im\phi \quad (4').$$

Meanwhile, when the value of L/Im$\phi$ falls below 12 as defined by conditional formula (5), the total length of the zoom lens can be reduced to be short.

This advantageous effect will become more prominent in the case that conditional formula (5') below is satisfied within the range defined by conditional formula (5):

$$7 < L/Im\phi < 11 \quad (5').$$

Further, when the value of L/Im$\phi$ is less than or equal to 7, it will become difficult to correct chromatic aberration. In contrast, when conditional formula (5') is satisfied, such a problem will be avoided so that chromatic aberration can be corrected favorably.

Further, the advantageous effects below can be obtained particularly in the case that conditional formula (6) described above is satisfied in the projection zoom lens of the present invention:

$$1.0 < f1/fw < 5.0 \quad (6).$$

That is, the value of f1/fw becomes less than or equal to 1.0, it will become difficult to correct spherical aberration. When the value of f1/fw exceeds 1.0, such a problem will be avoided so that spherical aberration can be corrected favorably.

Further, when the value of f1/fw becomes greater than or equal to 5.0, it will become difficult to correct longitudinal chromatic aberration. Further, the diameters of the magnification-side lenses will increase. However, when the value of f1/fw falls below 5.0, such problems can be avoided so that longitudinal chromatic aberration can be easily corrected and the diameters of the magnification-side lenses will be reduced.

The advantageous effects described above will become prominent in the case that conditional formula (6') below is satisfied within the range defined by conditional formula (6):

$$2.0<f1/fw<4.0 \qquad (6').$$

Further, particularly in the case that conditional formula (7) described above is satisfied in the projection zoom lens of the present invention, a high zoom ratio can be secured and the range, in which the projection zoom lens can be used, can be widened:

$$1.4<Zr \qquad (7).$$

The advantageous effects described above will become more prominent in the case that conditional formula (7') below is satisfied within the range defined by conditional formula (7):

$$1.6<Zr \qquad (7').$$

Note that there is generally demand for zoom lenses which are applied to projection type display devices utilized in movie theaters, and the like to have F numbers of less than 3.0 (which is bright) over the entire zoom range. The projection zoom lenses of the present invention are capable of fulfilling such a demand. Specific numerical values thereof will be described later with reference to Examples.

Further, there is generally demand for the projection type display devices as described above to suppress distortion to within approximately 2% over the entire zoom range. The projection zoom lenses of the present invention are capable of fulfilling such a demand. Specific numerical values thereof will be described later with reference to the Examples.

The projection type display device of the present invention employs the zoom lenses of the present invention as described above as a projection zoom lens. Accordingly, a high zoom ratio can be secured and a constant numerical aperture can be maintained over the entire zoom range in the projection type display device of the present invention. Further, the total length of the zoom lens and the diameters of the most-magnification-side lens group can be reduced. Thereby, the zoom lens can be formed in a small size.

BRIEF DESCRIPTION OF THE DRAWINGS

FIG. 6 shows aberration diagrams A through L of the projection zoom lens according to the above Example 2.

DESCRIPTION OF THE PREFERRED EMBODIMENTS

Figure 1:
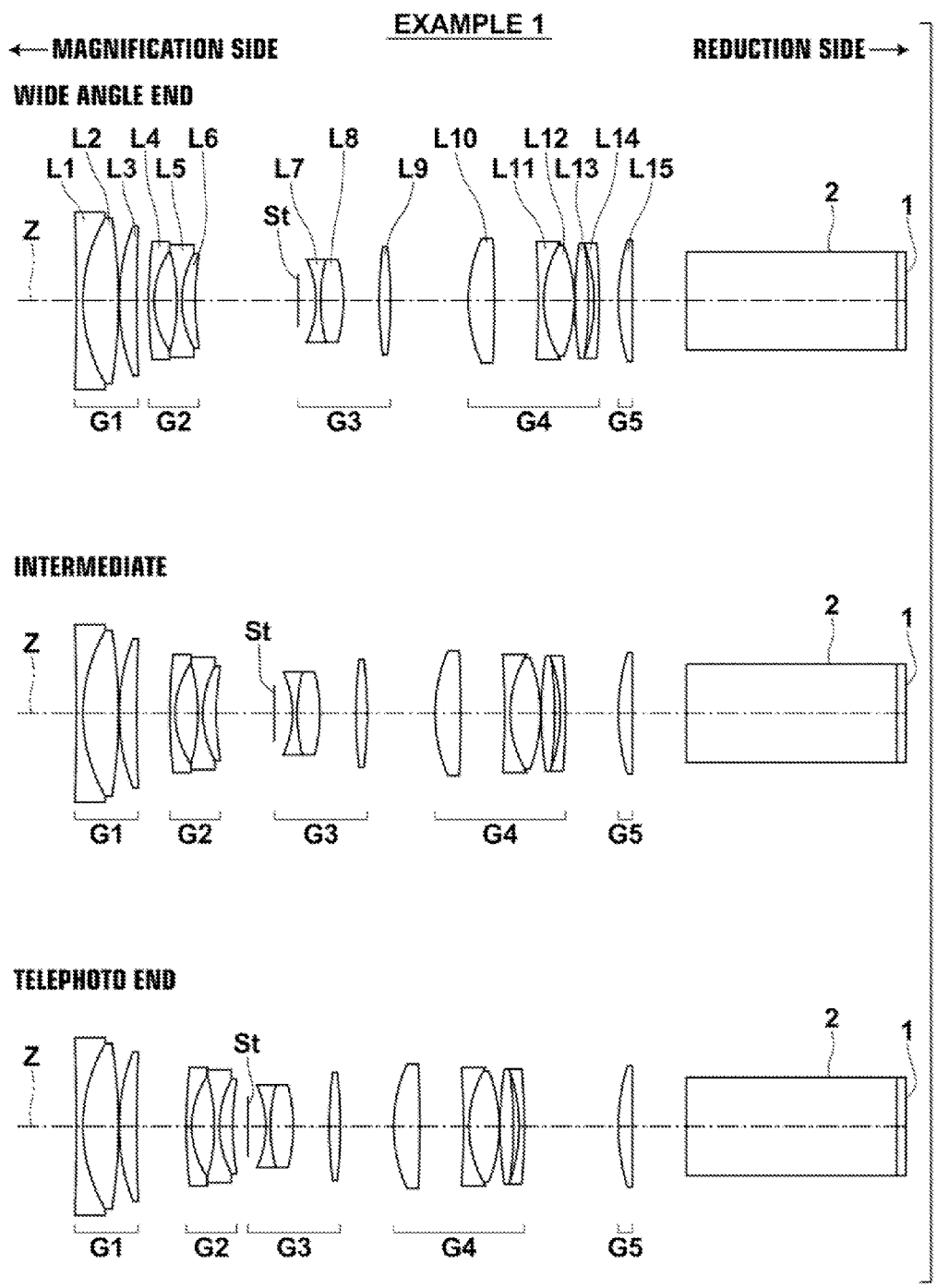
FIG. 1 is a collection of cross-sectional views of a projection zoom lens according to Example 1 of the present invention, illustrating the lens configuration thereof.
Figure 2:
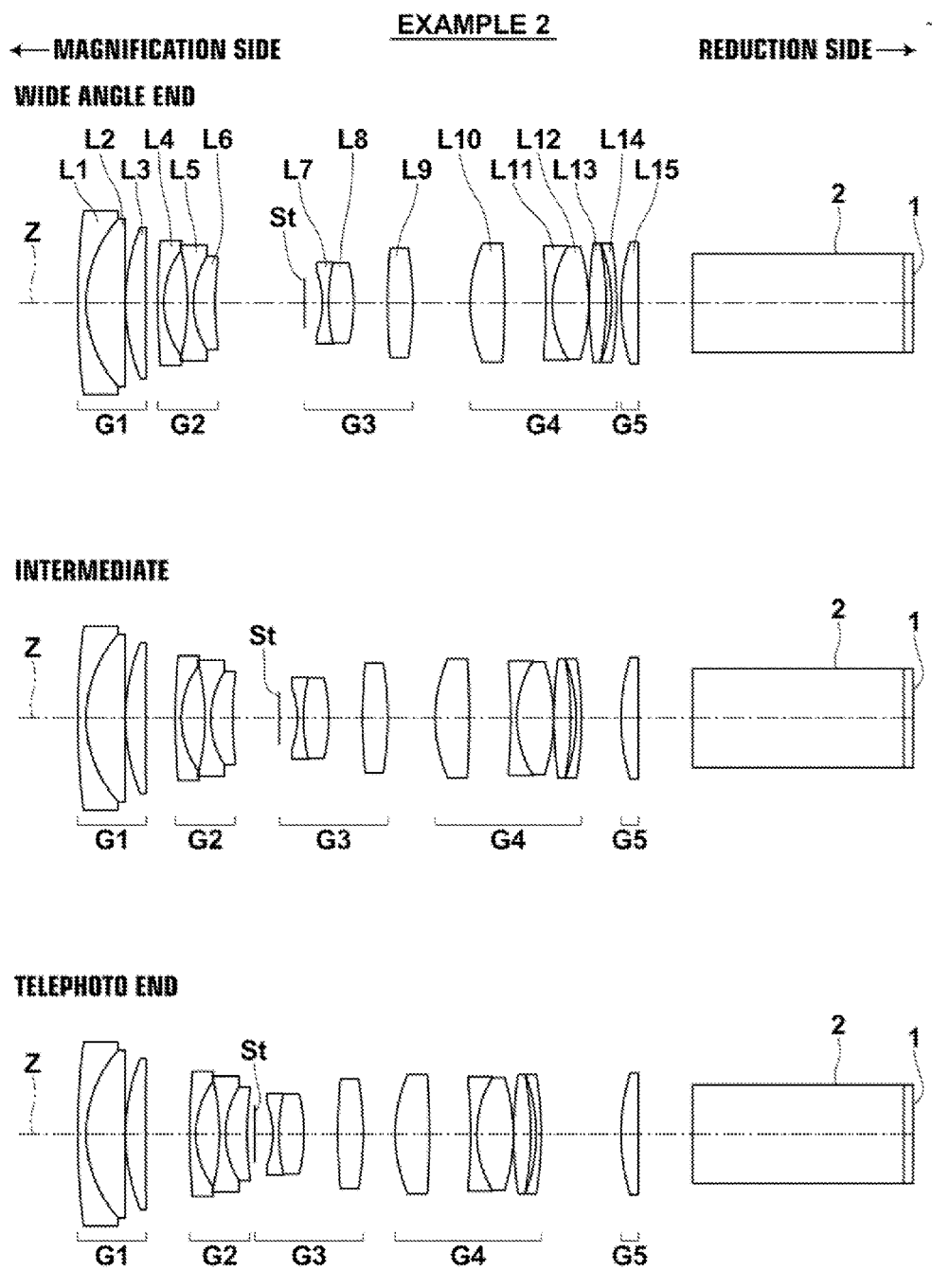
FIG. 2 is a collection of cross-sectional views of a projection zoom lens according to Example 2 of the present invention, illustrating the lens configuration thereof.
Figure 3:
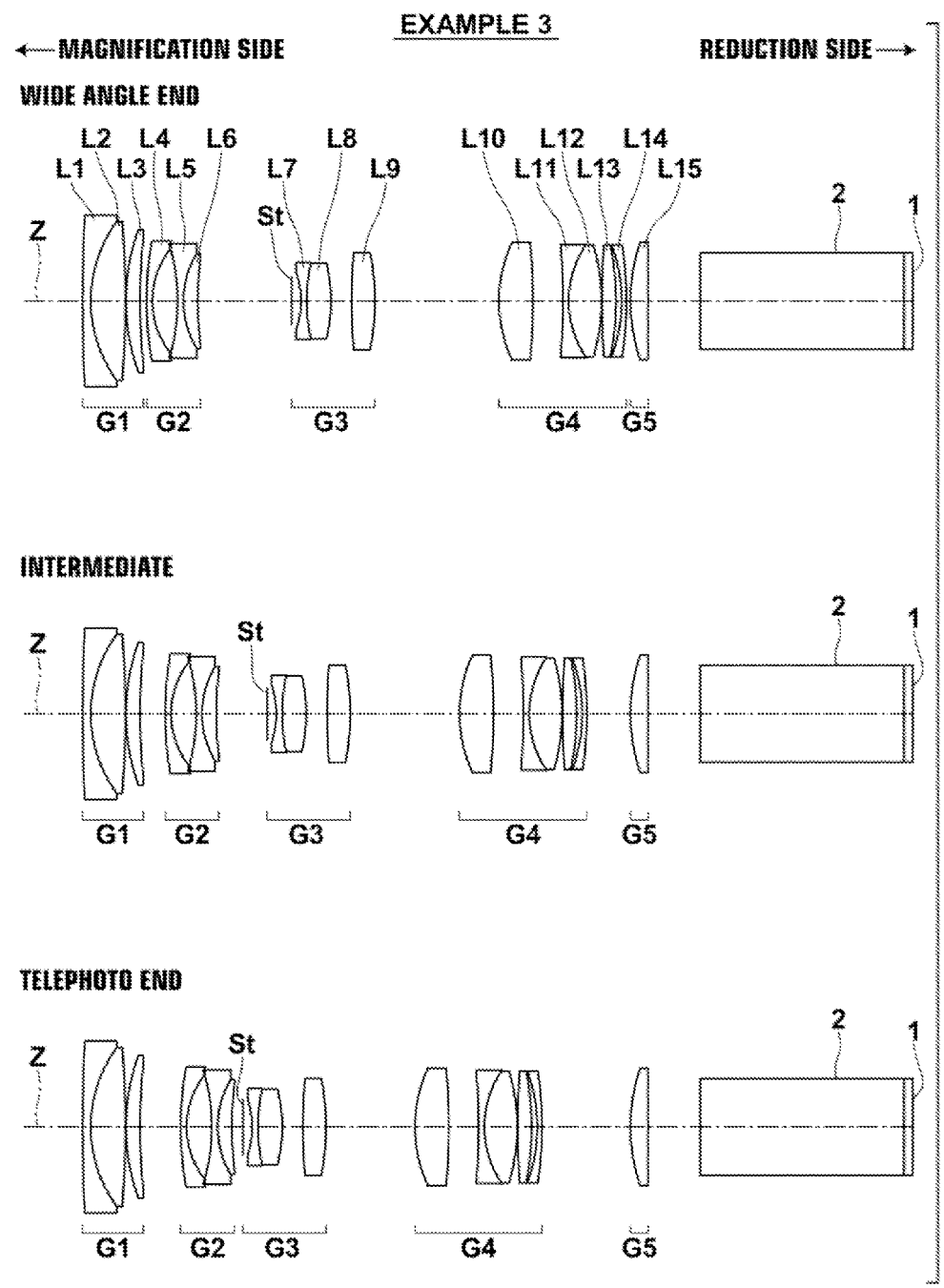
FIG. 3 is a collection of cross-sectional views of a projection zoom lens according to Example 3 of the present invention, illustrating the lens configuration thereof.
Figure 4:
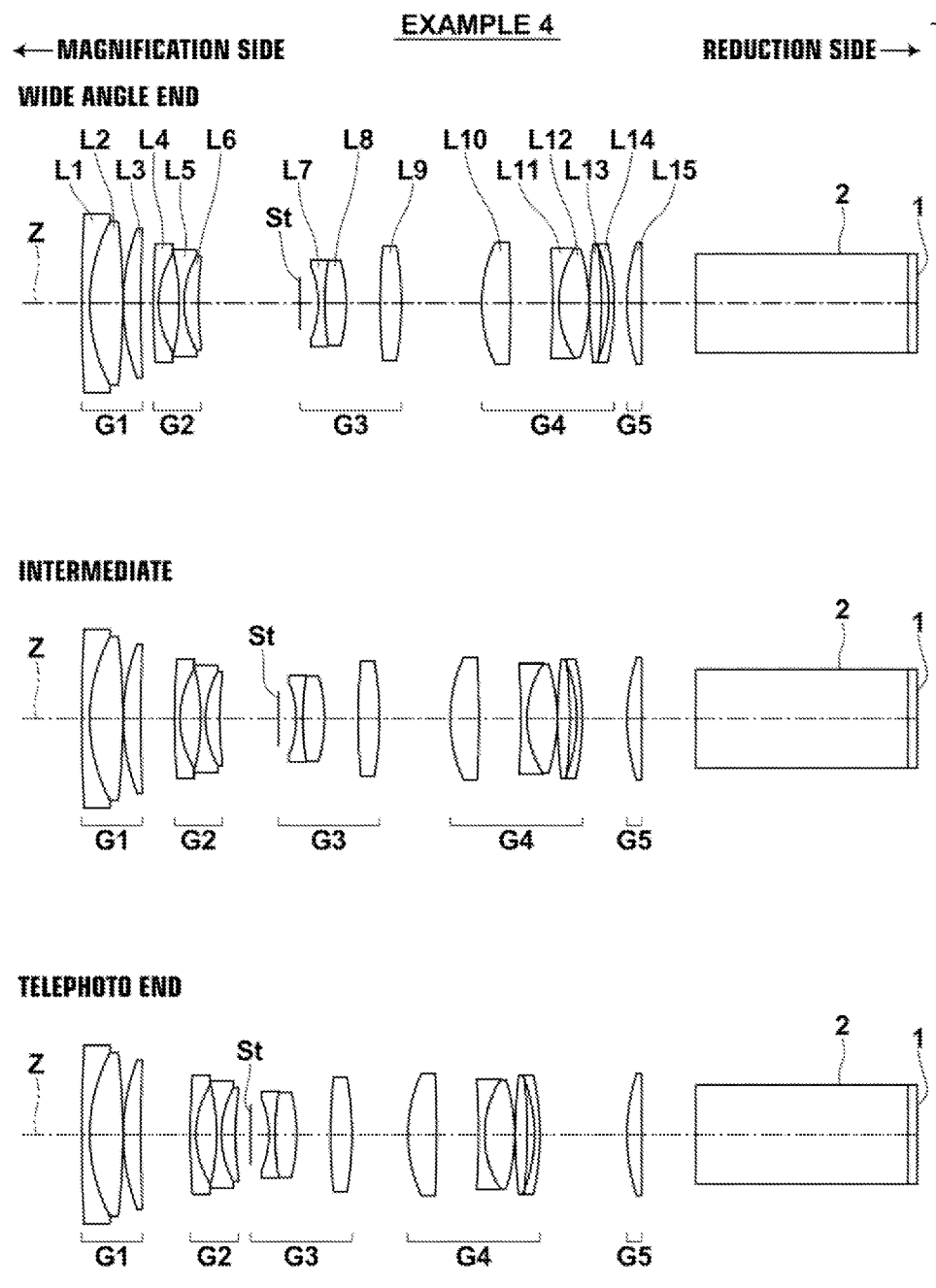
FIG. 4 is a collection of cross-sectional views of a projection zoom lens according to Example 4 of the present invention, illustrating the lens configuration thereof.

Hereinafter, embodiments of the present invention will be described in detail with reference to the accompanying drawings. First, a projection zoom lens according to one embodiment of the present invention will be described with reference to FIG. 1. FIG. 1 illustrates moving positions of the lens groups from the wide angle end, the telephoto end, and the intermediate position therebetween when the projection zoom lens according to Example 1 of the present invention is operated to change magnification. The manner, in which the configuration is shown, is the same as those in FIGS. 1 through 4. FIGS. 2 through 4 are cross-sectional views illustrating examples of other configurations according to the embodiments of the present invention, corresponding to projection zoom lenses according to Examples 2 through 4 to be described later. All of these projection zoom lenses are of a five-group configuration. These projection zoom lenses have the same basic configurations as for Example 1 except particularly described portions. Therefore, the embodiment of the present invention will be described below mainly with reference to the configuration illustrated in FIG. 1 as an example.

The projection zoom lens of the present embodiment can be loaded on projection type display devices utilized in movie theaters, and the like to produce digital images. For example, the projection zoom lens of the present embodiments can be used as a projection lens which projects image information displayed on a light valve onto a screen. In FIG. 1, the left side is designated as the magnification side and the right side is designated as the reduction side. Further, supposing a case that the projection zoom lens is mounted on the projection type display devices, FIG. 1 also shows glass blocks 2, 1, such as a color combining prism (which includes a filter and the like). This applies to FIGS. 2 through 4 below in the same manner as FIG. 1. Note that an image display surface of the light valve lies on the reduction-side surface of the glass block 1, for example.

In the projection type display device, a light beam, which has been provided with image information at the image display surface above, enters the projection zoom lens via the glass blocks 2, 1. Then, the projection zoom lens enlarges and projects images onto a screen (not shown) disposed toward the leftward direction in the Figure.

According to the description above, FIG. 1 shows an example in which the position of the reduction-side surface of the glass block 2 matches the position of the image display surface. The projection zoom lens of the present invention, however, is not necessarily limited to such a configuration. Further, according to the description above, only one image display surface is provided with the projection type display device. However, the projection type display device may be configured to have a color separation optical system to separate the light beam from the light source into the three primary colors and to include three light valves which respectively correspond to the three primary colors so that full color images can be displayed.

The projection zoom lens according to the present embodiment essentially consists of a first lens group G1 having a positive refractive power, a second lens group G2 having a negative refractive power, a third lens group G3 having a negative refractive power, a fourth lens group G4 having a positive refractive power, and a fifth lens group G5 having a positive refractive power as substantial lens groups. The first lens group G1 is disposed at the most-magnification side and fixed while changing magnification. The second lens group G2 is disposed next to the first lens group G1 at the reduction side and caused to move while changing magnification. The third lens group G3 is disposed next to the second lens group G2 at the reduction side and caused to move while changing magnification. The fourth lens group G4 is disposed next to the third lens group G3 at the reduction side and caused to move while changing magnification. The fifth lens group G5 is disposed at the most-reduction side and fixed while changing magnification. Further, the projection zoom lens according to the present embodiment is configured to be telecentric at the reduction side. The configurations of the lens groups described above are the same as for Examples 1 through 4.

Further, such a projection zoom lens is configured to move the first lens group G1 to perform focusing.

As shown in an example of FIG. 1, the first lens group G1 consists of three lenses (the first lens L1 through the third lens L3), and the second lens group G2 consists of three lenses (the fourth lens L4 through the sixth lens L6). Further, the third lens group G3 consists of three lenses (the seventh lens L7 through the ninth lens L9) and an aperture stop St positioned at the magnification side thereof, and the fourth lens group G4 consists of five lenses (the tenth lens L10 through the fourteenth lens L14). Further, the fifth lens group G5 consists of one lens (the fifteenth lens L15). However, the number of lenses that constitute each lens group is not limited to the example shown in FIG. 1.

In the projection zoom lens of the present embodiment, the aperture stop St positioned within the third lens group G3 is configured to move with the third lens group G3 in an integrated manner. This applies to Examples 1 through 4. Further, this aperture stop St is configured to be a variable stop that varies the aperture diameter (stop diameter) accompanying changes in magnification so as to maintain the numerical aperture of the zoom lens constant over the entire zoom range. Note that such an aperture stop St may be positioned in the exterior of lenses that constitute the moving lens group as in the present embodiment, in the projection zoom lens of the present invention. Alternatively, the aperture stop St may be positioned between lenses that constitute the moving lens group. Further, the aperture stop St may be configured to move along the optical axis Z independently from the moving lens group.

The projection zoom lens of the present embodiment consists of the first lens group G1 having a positive refractive power, which is fixed while changing magnification; a plurality of moving lens groups (the second lens group G2, the third lens group G3, and the fourth lens group G4) positioned at the reduction side of this first lens group G1, which move while changing magnification; and the aperture stop St positioned within the third lens group G3 which is one of the moving lens groups. Further, the projection zoom lens is configured to maintain the numerical aperture constant over the entire zoom range. This enables the total length of the zoom lens and the diameters of lenses within the first lens group G1 to become shorter than those of the projection zoom lens disclosed in Patent Document 1 in which both the most-reduction-side lens group and the aperture stop positioned at the magnification side thereof are fixed while changing magnification to maintain the numerical aperture constant.

Further, this projection zoom lens satisfies conditional formula (1) below when the amount of movement between the wide angle end and the telephoto end of the fourth lens group G4 which is the most-reduction-side moving lens group is mr and the focal length of the entire system at the wide angle end is fw:

$$0.3 < mr/fw \qquad (1).$$

Thereby, the advantageous effect that the total length of the zoom lens and the diameters of lenses within the first lens group G1 can be reduced further will be obtained.

Further, the advantageous effects described above will become more prominent in the case that conditional formula (1') described above is satisfied within the range defined by conditional formula (1).

Note that Table 9 shows a collection of the values of the conditions (i.e., the equations) defined by conditional formula (1) and conditional formulas (2) through (7) to be described below for each of Examples 1 through 4.

Further, the projection zoom lens of the present embodiment, in which the fifth lens group G5 having a positive refractive power, i.e., the final lens group positioned at the most-reduction side is fixed while changing magnification, satisfies conditional formula below when the focal length of the fifth lens group G5 is fe and the focal length of the entire system at the wide angle end is fw:

$$2.0 < fe/fw < 7.0 \qquad (2).$$

Thereby, spherical aberration can be corrected favorably and the diameters of lenses within the first lens group G1 can be reduced. As a result, the zoom lens can be formed in a small size and spherical aberration at the telephoto end can be reduced. The detailed reason therefor has been already given.

The advantageous effects described above will become more prominent in the case that conditional formula (2') described above is satisfied within the range defined by conditional formula (2).

Further, the projection zoom lens of the present embodiment satisfies conditional formula (3) below when the amount of movement between the wide angle end and the telephoto end of the second lens group G2 which is the most-magnification-side moving lens group is mm and the amount of movement between the wide angle end and the telephoto end of the fourth lens group G4 which is the most-reduction-side moving lens group is mr:

$$-1.0 < mm/mr < -0.2 \qquad (3).$$

Thereby, the fluctuations in lateral chromatic aberration and field curvature while changing magnification can be reduced. The detailed reason therefor has already been given.

The advantageous effects described above will become more prominent in the case that conditional formula (3') described above is satisfied within the range defined by conditional formula (3).

Further, the projection zoom lens of the present embodiment satisfies conditional formulas (4) and (5) below when the back focus (air converted length) at the reduction side of the entire system at the wide angle end is Bf, the maximum effective image circle diameter (image circle diameter) at the reduction side is Imφ, and the distance between the mostmagnification-side lens surface (the magnification-side lens surface of the first lens L1) and the most-reduction-side lens surface (the reduction-side lens surface of the fifteenth lens L15) along the optical axis when the projection distance is infinite is L:

$$2.0 < Bf/Im\phi \quad (4)$$

$$L/Im\phi < 12 \quad (5).$$

As the projection zoom lens of the present embodiment satisfies conditional formula (4) in such a manner, a sufficiently long back focus can be obtained. The detailed reason therefor has been already given. Specific numerical values of the back focus for each Example will be shown in Tables below. The advantageous effects described above will become more prominent in the case that conditional formula (4') described above is satisfied within the range defined by conditional formula (4).

As the projection zoom lens of the present embodiment satisfies conditional formula (5), the total length of the zoom lens can be reduced, resulting in miniaturization being achieved. This advantageous effects will become more prominent in the case that conditional formula (5') described above is further satisfied within the range defined by conditional formula (5). Further, in such a case, chromatic aberration can be corrected favorably. The detailed reason therefor has been already given.

Further, the projection zoom lens of the present embodiment satisfies conditional formula (6) below when the focal length of the first lens group G1 is f1 and the focal length of the entire system at the wide angle end is fw:

$$1.0 < f1/fw < 5.0 \quad (6).$$

Thereby, spherical aberration and longitudinal chromatic aberration can be easily corrected, and the diameters of lenses within the first lens group G1 can be reduced. The detailed reason therefor has already been given.

The advantageous effects will become more prominent in the case that conditional formula (6') described above is satisfied within the range defined by conditional formula (6).

Further, the projection zoom lens of the present embodiment satisfies conditional formula (7) below when the zoom ratio of the telephoto end with respect to the wide angle end is Zr:

$$1.4 < Zr \quad (7).$$

Thereby, the projection zoom lens of the present embodiment can secure a high zoom ratio and the range in which the projection zoom lens can be used can be widened.

The advantageous effects described above will become more prominent in the case that conditional formula (7') described above is satisfied within the range defined by conditional formula (7).

Figure 9:
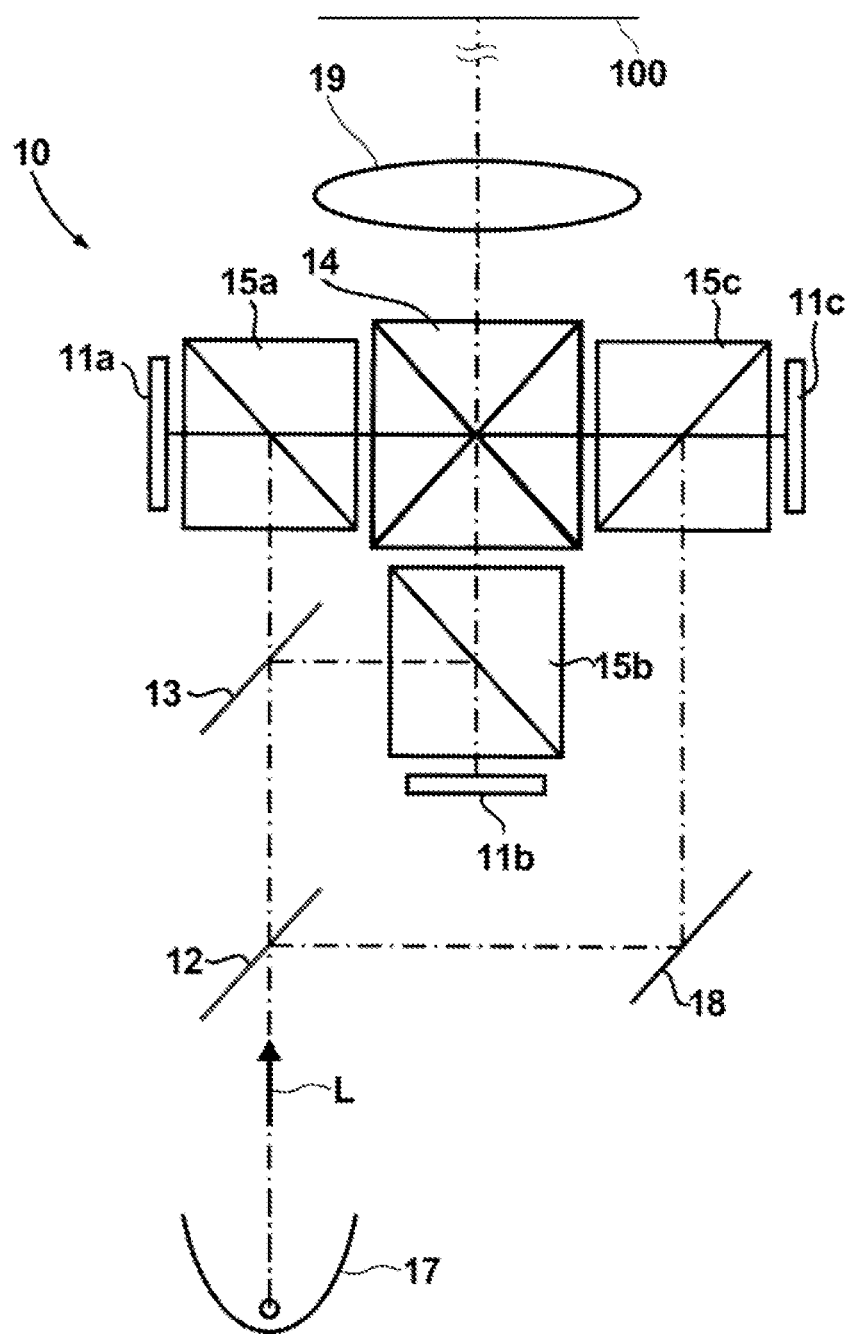
FIG. 9 is a schematic configuration diagram of a projection type display device according to an embodiment of the present invention.

Next, the embodiment of the projection type display device according to the present invention will be described with reference to FIGS. 9 and 10. FIG. 9 is a schematic configuration diagram of a part of a projection type display device according to one embodiment of the present invention. The projection type display device illustrated in FIG. 9 includes an illumination optical system 10. The illumination optical system 10 includes reflection type display elements 11a through 11c as light valves respectively corresponding to the colored light beams, dichroic mirrors 12, 13 for color separation, a cross dichroic prism 14 for combining colors, a total reflection mirror 18 for deflecting optical paths, and polarized light separation prisms 15a through 15c. Note that a light source 17 which emits a white light beam L is disposed in the front of the dichroic mirror 12.

A white light beam L emitted from the light source 17 is separated into three colored light (G light, B light, and R light) by the dichroic mirrors 12, 13. The separated colored light beams respectively enter the reflection type display elements 11a through 11c corresponding thereto to be optically modulated, via the polarized light separation prisms 15a through 15c. The optically modulated light beams are subjected to the color composition by the cross dichroic prism 14, and then enters the projection zoom lens 19 according to the embodiment of the present invention. Then, optical images formed by the entered light are projected onto a screen 100 by the projection zoom lens 19.

Figure 10:
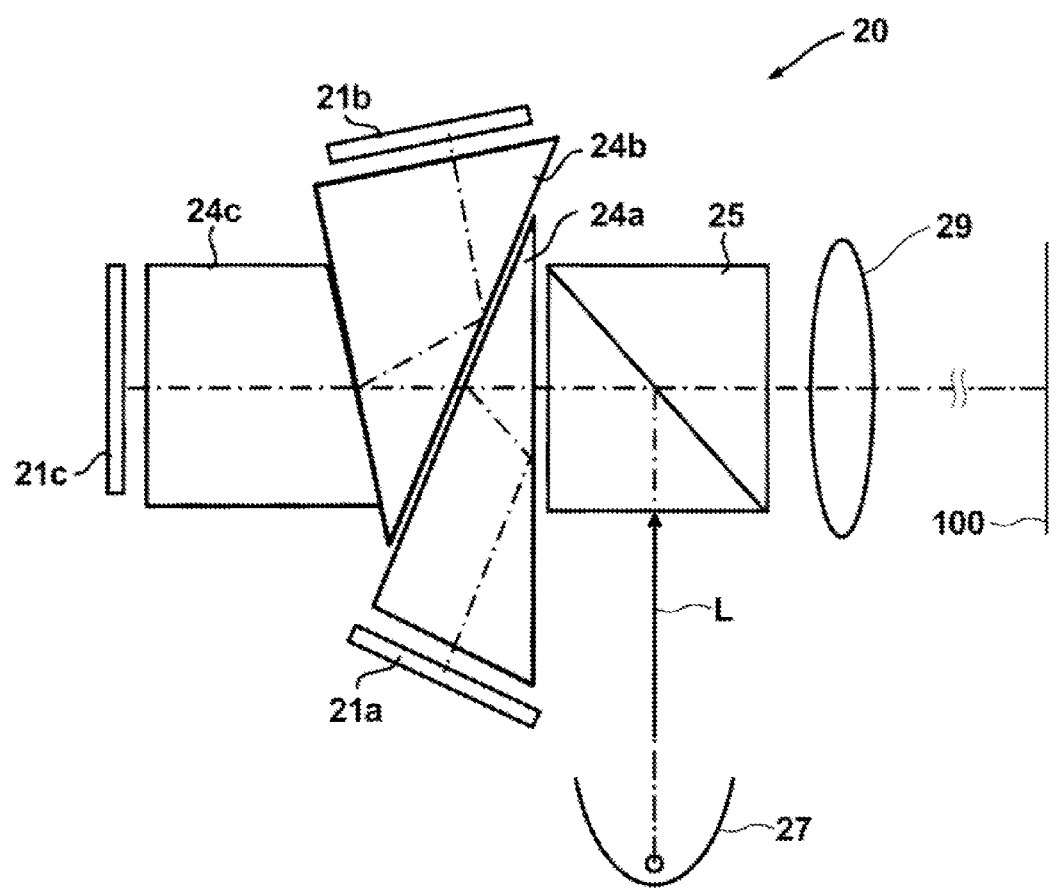
FIG. 10 is a schematic configuration diagram of a projection type display device according to another embodiment of the present invention.

Next, FIG. 10 is a schematic configuration diagram of a part of a projection type display device according to another embodiment of the present invention. The projection type display device illustrated in FIG. 10 includes an illumination optical system 20. The illumination optical system 20 includes reflection type display elements 21a through 21c as light valves respectively corresponding to the colored light beams, TIR (Total Internal Reflection) prisms 24a through 24c for a color separation and color composition, and a polarized light separation prism 25. Note that a light source 27 which emits a white light beam L is disposed in the front of the polarized light separation prism 25.

A white light beam emitted from the light source 27 passes through the polarized light separation prism 25, and then is separated into three colored light (G light, B light, and R light) by the TIR prisms 24a through 24c. The separated colored light beams respectively enter the reflection type display elements 21a through 21c corresponding thereto to be optically modulated. The optically modulated light beams travel again through the TIR prism 24a through 24c in the opposite direction to be combined, and then are transmitted through the polarized light separation prism 25 to enter the projection zoom lens 29 according to the embodiment of the present invention. Then, optical images formed by the entered light are projected onto a screen 100 by the projection zoom lens 29.

Note that the reflection type display elements 11a through 11c and 21a through 21c may be reflection type liquid crystal display elements, DMD's, or the like, for example. Although FIGS. 9 and 10 show examples in which the reflection type display elements are utilized as light valves, the light valves included in the projection type display device of the present invention are not limited to these elements, and transmissive display elements such as transmissive type liquid crystal display elements and the like may be employed.

Next, specific Examples of the projection zoom lens of the present invention will be described.

Example 1

FIG. 1 illustrates an arrangement of the lens groups of the projection zoom lens of Example 1 at each of the wide angle end, the telephoto end, and the intermediate position therebetween. Note that since the detailed descriptions of FIG. 1 has already been given, redundant descriptions will be omitted unless particularly necessary.

In the projection zoom lens of this Examples 1, the first lens group G1 consists of three lenses: a first lens L1 having a negative refractive power (hereinafter, a lens having a positive or negative refractive power will be simply referred to as a "positive" or "negative" lens), a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other. The fifth lens L5 and the sixth lens L6 are cemented to each other. The eleventh lens L11 and the twelfth lens L12 are cemented to each other as well.

Table 1 shows basic lens data of the projection zoom lens of Example 1. The glass blocks 2, 1 are also shown therein. In Table 1, i-th (i=1, 2, 3, . . . ) surface numbers, the value of i sequentially increasing from the surface of the constituent element at the most-magnification side, which is designated as 1, toward the reduction side, are shown in the column Si. The radii of curvature of i-th surfaces are shown in the column Ri, and distances between i-th surfaces and (i+1)th surfaces along the optical axis Z are shown in the column Di. Further, the refractive indices of j-th (j=1, 2, 3, . . . ) constituent elements with respect to the d-line (wavelength: 587.6 nm), the value of j sequentially increasing from the constituent element at the most magnification side, which is designated as 1, toward the reduction side, are shown in the column Ndj. The Abbe numbers of j-th constituent elements with respect to the d-line are shown in the column vdj.

Note that the values of the radius of curvature R and the distance between surfaces D shown in Table 1 are standardized such that the focal length of the entire system of the projection zoom lens at the wide angle end becomes 10.00. The numerical values in Table 1 are rounded to a predetermined number of digits. The sign of the radius of curvature is positive in the case that a surface shape is convex on the magnification side, and negative in the case that the surface shape is convex on the reduction side.

Among the distances between surfaces D, the distance between the first lens group G1 and the second lens group G2, the distance between the second lens group G2 and the third lens group G3, the distance between the third lens group G3 and the fourth lens group G4, and the distance between the fourth lens group G4 and the fifth lens group G5 are variable distances that vary while changing magnification. DD 5, DD 10, DD 17, and DD 26, which are respectively represented by indicating "DD" with the surface number of the frontward surface from which the distance is measured, are respectively shown in the spaces of the distance between surfaces corresponding to these distances.

The same as described above applies to Tables 3, 5 and 7 to be described later. Regarding the distances between variable lens groups as listed above, the numbers that follow "DD" change according to the number of the constituent elements in each of the Examples. However, each of the distances between the variable lens groups is represented by indicating the surface number of the frontward surface from which the distance is measured in the same manner in all of the Tables.

Table 2 shows the values of the focal length f of the entire system, back focus Bf, the variable distances DD5, DD10, DD17, and DD26, and the stop diameter of the aperture stop St (which refers to the aperture diameter: the diameter) at each of the wide angle end, an intermediate position, and the telephoto end while changing magnification in the project zoom lens of Example 1. These numerical values are also standardized such that the focal length of the entire system at the wide angle end is 10.00. In addition, these numerical values are for when the projection distance is infinity. Table 2 also shows the zoom ratios (a zoom ratio is 1.00 at the wide angle end), the F numbers (numerical aperture) Fno., and the full angle of view 2ω (the unit is a degree) of the zoom lens of Example 1. The values of the F numbers are maintained at a constant value of 2.5, which is sufficiently smaller than 3.0 described above, at the wide angle end, the intermediate position, and the telephoto end. The same applies to Examples 2 through 4 to be described later.

The manner, in which Table 2 is shown as described above, is the same as those of Tables 4, 6, and 8.

TABLE 1

Example 1: Basic Lens Data

| Si Surface Number | Ri Radius of Curvature | Di Distance Between Surfaces | Ndj Refractive Index | vdj Abbe's Number |
|---|---|---|---|---|
| 1 | −308.9615 | 0.685 | 1.80518 | 25.42 |
| 2 | 17.4931 | 3.669 | 1.72047 | 34.71 |
| 3 | −55.4171 | 0.062 | | |
| 4 | 22.1462 | 1.813 | 1.77250 | 49.60 |
| 5 | 196.1507 | DD[5] | | |
| 6 | 54.9244 | 0.558 | 1.61800 | 63.33 |
| 7 | 9.4940 | 2.361 | | |
| 8 | −18.7868 | 0.499 | 1.48749 | 70.23 |
| 9 | 10.5135 | 1.382 | 1.73800 | 32.26 |
| 10 | 29.6141 | DD[10] | | |
| 11(Aperture stop) | ∞ | 1.861 | | |
| 12 | −10.2665 | 0.465 | 1.78590 | 44.20 |
| 13 | 16.9441 | 0.012 | | |
| 14 | 17.3787 | 2.343 | 1.51742 | 52.43 |
| 15 | −17.3787 | 3.715 | | |
| 16 | 46.7497 | 1.159 | 1.80518 | 25.42 |
| 17 | −46.7497 | DD[17] | | |
| 18 | 16.1146 | 2.693 | 1.49700 | 81.54 |
| 19 | −135.8991 | 4.532 | | |
| 20 | −96.4823 | 0.561 | 1.78590 | 44.20 |
| 21 | 11.8321 | 3.138 | 1.49700 | 81.54 |
| 22 | −16.0758 | 0.091 | | |
| 23 | 41.9300 | 1.381 | 1.58913 | 61.14 |
| 24 | −41.9300 | 0.582 | | |
| 25 | −17.6180 | 0.527 | 1.75520 | 27.51 |
| 26 | −66.5989 | DD[26] | | |
| 27 | 21.6119 | 1.450 | 1.62299 | 58.16 |
| 28 | ∞ | 5.595 | | |
| 29 | ∞ | 21.707 | 1.51633 | 64.14 |
| 30 | ∞ | 0.930 | 1.50847 | 61.19 |
| 31 | ∞ | | | |

TABLE 2

Example 1: Data Regarding Zooming

| | Wide Angle End | Intermediate Position | Telephoto End |
|---|---|---|---|
| Zoom Ratio | 1.00 | 1.37 | 1.87 |
| f | 10.00 | 13.70 | 18.70 |
| Bf | 20.53 | 20.53 | 20.53 |
| FNo. | 2.50 | 2.50 | 2.50 |
| 2ω[°] | 39.0 | 28.8 | 21.2 |
| DD[5] | 1.240 | 3.412 | 5.113 |
| DD[10] | 10.588 | 6.005 | 1.552 |
| DD[17] | 8.042 | 6.981 | 5.481 |

TABLE 2-continued

Example 1: Data Regarding Zooming

|  | Wide Angle End | Intermediate Position | Telephoto End |
|---|---|---|---|
| DD[26] | 1.973 | 5.446 | 9.696 |
| Stop Diameter | 5.41 | 5.714 | 6.144 |

Table 9 shows the values of the conditions (the equations) defined by conditional formulas (1) through (7) for each of Examples 1 through 4. As shown therein, conditional formulas (1) through (7) are satisfied in Example 1. Substantially the same applies to the other Examples 2 through 4. Further, a high zoom ratio Zr of 1.87 is secured in all of Examples 1 through 4 as shown in Table 9.

Further, Table 10 shows the main specifications in Examples 1 through 4. The signs f2, f3, and f4 in Table 10 respectively represent the focal lengths of the second lens group G2, the third lens group G3, and the fourth lens group G4.

Figure 5:
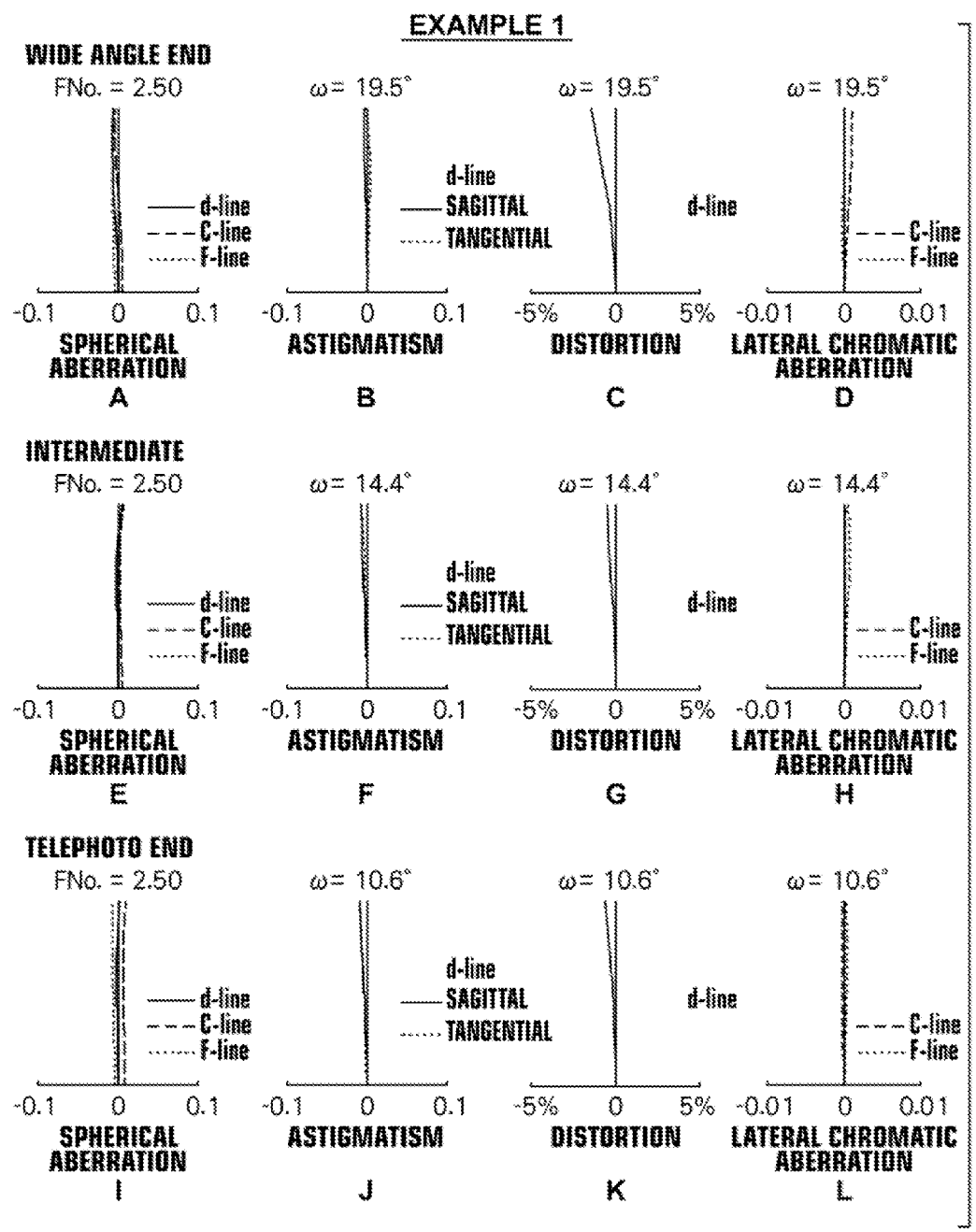
FIG. 5 shows aberration diagrams A through L of the projection zoom lens according to the above Example 1.

A through D of FIG. 5 respectively show aberration diagrams of spherical aberration, astigmatism, distortion, and lateral chromatic aberration of the projection zoom lens according to Example 1, at the wide angle end. E through H of FIG. 5 respectively show aberration diagrams of spherical aberration, astigmatism, distortion, and lateral chromatic aberration of the projection zoom lens according to Example 1, at the intermediate position. I through L of FIG. 5 respectively show aberration diagrams of spherical aberration, astigmatism, distortion, and lateral chromatic aberration of the projection zoom lens according to Example 1, at the telephoto end. As shown in FIG. 5, distortion is suppressed to within approximately 2% over the entire zoom range in Example 1. Substantially the same applies to the other Examples 2 through 4.

Each of the aberration diagrams of A through L of FIG. 5 applies the d-line as a reference. However, the spherical aberration diagram shows aberrations with respect to the C-line (wavelength: 656.3 nm) and the F-line (wavelength: 486.1 nm) as well, and the lateral chromatic aberration diagram also shows aberrations with respect to the C-line and the F-line. Further, the astigmatism diagram shows aberration in a sagittal direction with a solid line and aberration in a tangential direction with a broken line. The sign "Fno.", which is indicated above the vertical axis in the spherical aberration diagram, refers to the F number, and the sign "107", which is indicated above the vertical axis in the other aberration diagrams, refers to a half angle of view. Note that these values are for when the projection distance is infinity.

Arrangement diagrams of lens groups, the symbols in the Tables and the aberration diagrams, the meanings thereof, and the manners in which they are shown for Example 1 described above are basically the same for Examples 2 through 4 below, unless otherwise noted. The points that the arrangement diagrams (FIG. 1) of the lens groups of Example 1 described above are at the wide angle end, at the intermediate position, and at the telephoto end, and that the aberration diagrams are at the wide angle end, the intermediate position, and the telephoto end also similarly apply to Examples 2 through 4.

Example 2

FIG. 2 shows a collection of the arrangement of the lens groups in the projection zoom lens of Example 2 at the wide angle end, the telephoto end, and the intermediate position therebetween.

In the projection zoom lens of Example 2, the first lens group G1 consists of three lenses: a negative first lens L1, a positive second lens L2, and a positive third lens L3 disposed in this order from the magnification side. Further, the second lens group G2 consists of three lenses: a negative fourth lens L4, a negative fifth lens L5 and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other. The fifth lens L5 and the sixth lens L6 are cemented to each other. The seventh lens L7 and the eighth lens L8 are cemented to each other, and the eleventh lens L11 and the twelfth lens L12 are cemented to each other as well.

Table 3 shows the basic lens data of the projection zoom lens of Example 2. Further, Table 4 shows the specs of the projection zoom lens of Example 2 at each of the wide angle end, the intermediate position, and the telephoto end while changing magnification in the same manner as in Table 2.

TABLE 3

Example 2: Basic Lens Data

| Si Surface Number | Ri Radius of Curvature | Di Distance Between Surfaces | Ndj Refractive Index | vdj Abbe's Number |
|---|---|---|---|---|
| 1 | 76.5490 | 0.874 | 1.80518 | 25.42 |
| 2 | 13.3935 | 3.988 | 1.72047 | 34.71 |
| 3 | −34212.0665 | 0.062 | | |
| 4 | 21.1772 | 2.080 | 1.77250 | 49.60 |
| 5 | 2815.0492 | DD[5] | | |
| 6 | 75.0061 | 0.622 | 1.61800 | 63.33 |
| 7 | 9.5305 | 2.429 | | |
| 8 | −24.4663 | 0.625 | 1.61800 | 63.33 |
| 9 | 9.2585 | 2.237 | 1.73800 | 32.26 |
| 10 | 36.2329 | DD[10] | | |
| 11(Aperture stop) | ∞ | 1.867 | | |
| 12 | −9.5751 | 0.626 | 1.80610 | 40.92 |
| 13 | 18.5396 | 2.597 | 1.51742 | 52.43 |
| 14 | −17.7270 | 3.486 | | |
| 15 | 58.5114 | 2.611 | 1.80518 | 25.42 |
| 16 | −33.7601 | DD[16] | | |
| 17 | 15.5439 | 3.543 | 1.49700 | 81.54 |
| 18 | −90.1437 | 4.275 | | |
| 19 | −59.6413 | 0.626 | 1.80610 | 40.92 |
| 20 | 11.6284 | 3.762 | 1.49700 | 81.54 |
| 21 | −19.9931 | 0.062 | | |
| 22 | 45.3783 | 1.745 | 1.58913 | 61.14 |
| 23 | −32.7877 | 0.547 | | |
| 24 | −18.2012 | 0.529 | 1.80518 | 25.42 |
| 25 | −39.9972 | DD[25] | | |
| 26 | 22.1653 | 1.763 | 1.62299 | 58.16 |
| 27 | −214748.3648 | 5.616 | | |
| 28 | ∞ | 21.781 | 1.51633 | 64.14 |
| 29 | ∞ | 0.933 | 1.50847 | 61.19 |
| 30 | ∞ | | | |

TABLE 4

Example 2: Data Regarding Zooming

|  | Wide Angle End | Intermediate Position | Telephoto End |
|---|---|---|---|
| Zoom Ratio | 1.00 | 1.37 | 1.87 |
| f | 10.00 | 13.70 | 18.70 |
| Bf | 20.60 | 20.60 | 20.60 |
| FNo. | 2.50 | 2.50 | 2.50 |
| 2ω[°] | 39.2 | 29.0 | 21.4 |
| DD[5] | 1.245 | 3.049 | 4.546 |
| DD[10] | 9.186 | 4.806 | 0.769 |
| DD[16] | 5.936 | 4.876 | 3.283 |
| DD[25] | 0.463 | 4.098 | 8.232 |
| Stop Diameter | 5.146 | 5.432 | 5.832 |

A through L of FIG. 6 respectively correspond to the aberration diagrams of the projection zoom lens of Example 2.

Example 3

FIG. 3 shows a collection of the arrangement of the lens groups in the projection zoom lens of Example 3 at the wide angle end, the telephoto end, and the intermediate position therebetween.

In the projection zoom lens of Example 3, the first lens group G1 consists of three lenses: a negative first lens L1, a positive second lens L2, and a positive third lens L3 disposed in this order from the magnification side. Further, the second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other, and the fifth lens L5 and the sixth lens L6 are cemented to each other. The seventh lens L7 and the eighth lens L8 are cemented to each other, and the eleventh lens L11 and the twelfth lens L12 are cemented to each other as well.

Table 5 shows the basic lens data of the projection zoom lens of Example 3. Further, Table 6 shows the specs of the projection zoom lens of Example 3 at each of the wide angle end, the intermediate position, and the telephoto end while changing magnification in the same manner as in Table 2.

TABLE 5

Example 3: Basic Lens Data

| Si Surface Number | Ri Radius of Curvature | Di Distance Between Surfaces | Ndj Refractive Index | vdj Abbe's Number |
|---|---|---|---|---|
| 1 | 196.6138 | 0.875 | 1.80518 | 25.42 |
| 2 | 14.8356 | 3.694 | 1.83400 | 37.16 |
| 3 | −114.5447 | 0.062 | | |
| 4 | 23.1627 | 1.508 | 1.83400 | 37.16 |
| 5 | 68.0456 | DD[5] | | |

TABLE 5-continued

Example 3: Basic Lens Data

| Si Surface Number | Ri Radius of Curvature | Di Distance Between Surfaces | Ndj Refractive Index | vdj Abbe's Number |
|---|---|---|---|---|
| 6 | 37.5400 | 0.623 | 1.61800 | 63.33 |
| 7 | 9.2583 | 2.701 | | |
| 8 | −21.7364 | 0.626 | 1.61800 | 63.33 |
| 9 | 10.1093 | 1.531 | 1.83400 | 37.16 |
| 10 | 38.9980 | DD[10] | | |
| 11(Aperture stop) | ∞ | 1.000 | | |
| 12 | −9.5725 | 0.626 | 1.80610 | 40.92 |
| 13 | 19.9128 | 2.573 | 1.48749 | 70.23 |
| 14 | −17.6173 | 2.220 | | |
| 15 | 64.8111 | 2.479 | 1.80518 | 25.42 |
| 16 | −28.1572 | DD[16] | | |
| 17 | 15.4157 | 3.636 | 1.49700 | 81.54 |
| 18 | −70.0910 | 3.203 | | |
| 19 | −77.5904 | 0.626 | 1.77250 | 49.60 |
| 20 | 11.1171 | 3.509 | 1.49700 | 81.54 |
| 21 | −21.5999 | 0.062 | | |
| 22 | 97.4566 | 1.494 | 1.58913 | 61.14 |
| 23 | −30.3414 | 0.600 | | |
| 24 | −17.4509 | 0.498 | 1.80518 | 25.42 |
| 25 | −42.8362 | DD[25] | | |
| 26 | 20.5835 | 1.874 | 1.62299 | 58.16 |
| 27 | −214748.3648 | 5.614 | | |
| 28 | ∞ | 21.790 | 1.51633 | 64.14 |
| 29 | ∞ | 0.934 | 1.50847 | 61.19 |
| 30 | ∞ | | | |

TABLE 6

Example 3: Data Regarding Zooming

|  | Wide Angle End | Intermediate Position | Telephoto End |
|---|---|---|---|
| Zoom Ratio | 1.00 | 1.37 | 1.87 |
| f | 16.23 | 22.23 | 30.35 |
| Bf | 35.31 | 35.31 | 35.31 |
| FNo. | 2.50 | 2.50 | 2.50 |
| 2ω[°] | 39.2 | 29.0 | 21.4 |
| DD[5] | 0.697 | 2.692 | 4.354 |
| DD[10] | 10.051 | 5.415 | 1.173 |
| DD[16] | 13.318 | 11.734 | 9.514 |
| DD[25] | 0.453 | 4.678 | 9.479 |
| Stop Diameter | 5.144 | 5.504 | 6.008 |

Figure 7:
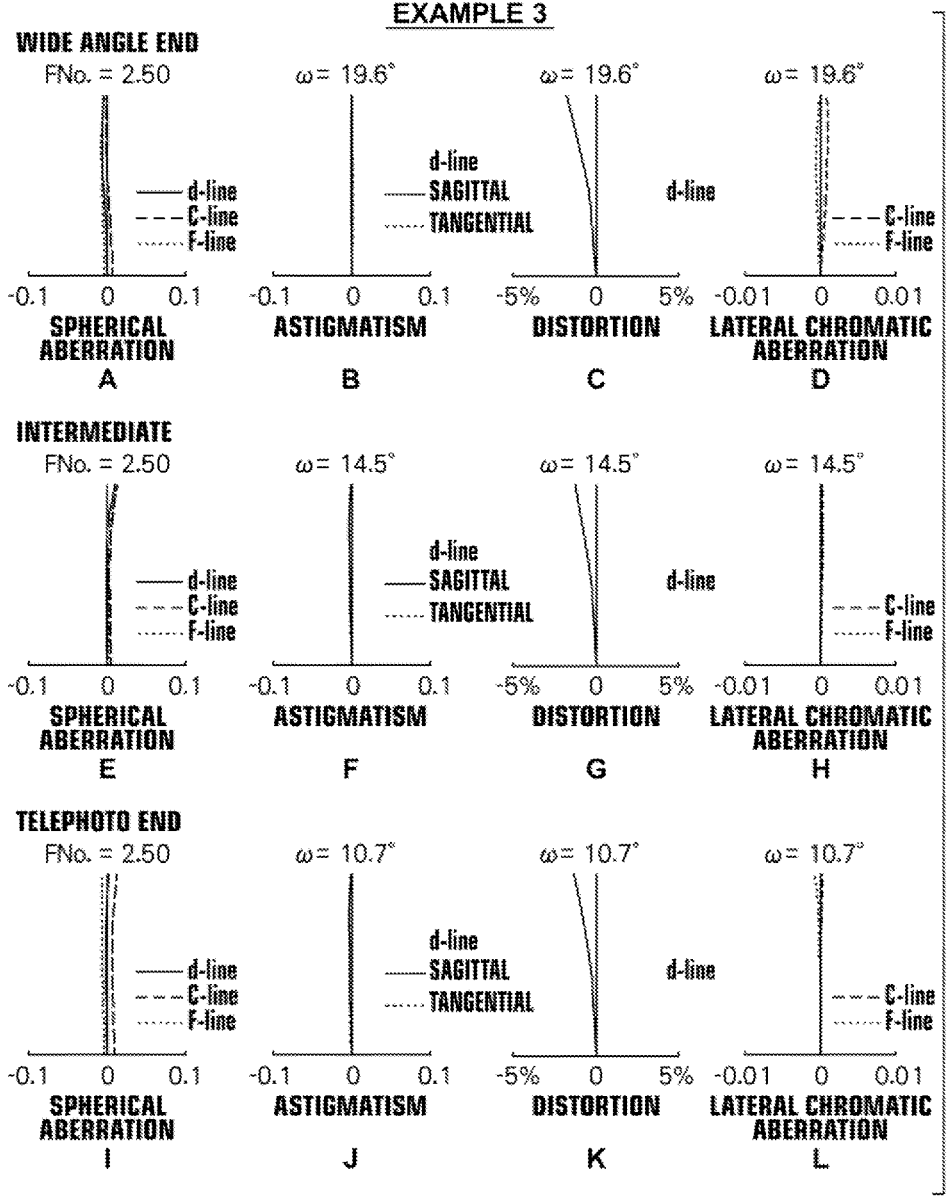
FIG. 7 shows aberration diagrams A through L of the projection zoom lens according to the above Example 3.

A through L of FIG. 7 respectively show the aberration diagrams of the projection zoom lens of Example 3.

Example 4

FIG. 4 shows a collection of the arrangement of the lens groups in the projection zoom lens of Example 4 at the wide angle end, the telephoto end, and the intermediate position therebetween.

In the projection zoom lens of this Example 4, the first lens group G1 consists of three lenses: a negative first lens L1, a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other, and the fifth lens L5 and the sixth lens L6 are cemented to each other. The eleventh lens L11 and the twelfth lens L12 are cemented to each other as well.

Table 7 shows the basic lens data of the projection zoom lens of Example 4. Further, Table 8 shows the specs of the projection zoom lens of Example 4 at each of the wide angle end, the intermediate position, and the telephoto end while changing magnification in the same manner as in Table 2.

TABLE 7

Example 4: Basic Lens Data

| Si Surface Number | Ri Radius of Curvature | Di Distance Between Surfaces | Ndj Refractive Index | vdj Abbe's Number |
|---|---|---|---|---|
| 1 | 183.0727 | 0.809 | 1.84666 | 23.78 |
| 2 | 18.4457 | 3.387 | 1.72047 | 34.71 |
| 3 | −80.5449 | 0.062 | | |
| 4 | 22.4937 | 1.805 | 1.77250 | 49.60 |
| 5 | 254.0232 | DD[5] | | |
| 6 | 82.1705 | 0.558 | 1.61800 | 63.33 |
| 7 | 9.7437 | 2.120 | | |
| 8 | −22.3435 | 0.499 | 1.53715 | 74.81 |
| 9 | 10.0824 | 1.446 | 1.72047 | 34.71 |
| 10 | 33.8623 | DD[10] | | |
| 11(Aperture stop) | ∞ | 1.861 | | |
| 12 | −9.4830 | 0.620 | 1.80610 | 40.92 |
| 13 | 25.7302 | 0.040 | | |
| 14 | 28.3996 | 2.196 | 1.51742 | 52.43 |
| 15 | −17.3443 | 3.460 | | |
| 16 | 58.8269 | 2.190 | 1.80518 | 25.42 |
| 17 | −34.7210 | DD[17] | | |
| 18 | 15.1705 | 2.951 | 1.53715 | 74.81 |
| 19 | −128.7052 | 4.322 | | |
| 20 | −77.7489 | 0.623 | 1.80610 | 40.92 |
| 21 | 10.8170 | 3.074 | 1.49700 | 81.54 |
| 22 | −18.6816 | 0.062 | | |
| 23 | 53.9367 | 1.228 | 1.58913 | 61.14 |
| 24 | −56.9792 | 0.750 | | |
| 25 | −16.2349 | 0.543 | 1.80518 | 25.42 |
| 26 | −28.5157 | DD[26] | | |
| 27 | 20.9770 | 1.501 | 1.62041 | 60.29 |
| 28 | −4723.6871 | 5.593 | | |
| 29 | ∞ | 21.706 | 1.51633 | 64.14 |
| 30 | ∞ | 0.930 | 1.50847 | 61.19 |
| 31 | ∞ | | | |

TABLE 8

Example 4: Data Regarding Zooming

| | Wide Angle End | Intermediate Position | Telephoto End |
|---|---|---|---|
| Zoom Ratio | 1.00 | 1.37 | 1.87 |
| f | 10.00 | 13.70 | 18.70 |
| Bf | 20.52 | 20.52 | 20.52 |
| FNo. | 2.50 | 2.50 | 2.50 |
| 2ω[°] | 39.0 | 28.6 | 21.2 |
| DD[5] | 1.240 | 3.430 | 5.057 |
| DD[10] | 10.447 | 6.005 | 1.561 |
| DD[17] | 8.253 | 7.251 | 5.722 |
| DD[26] | 1.319 | 4.573 | 8.920 |
| Stop Diameter | 5.332 | 5.608 | 5.988 |

Figure 8:
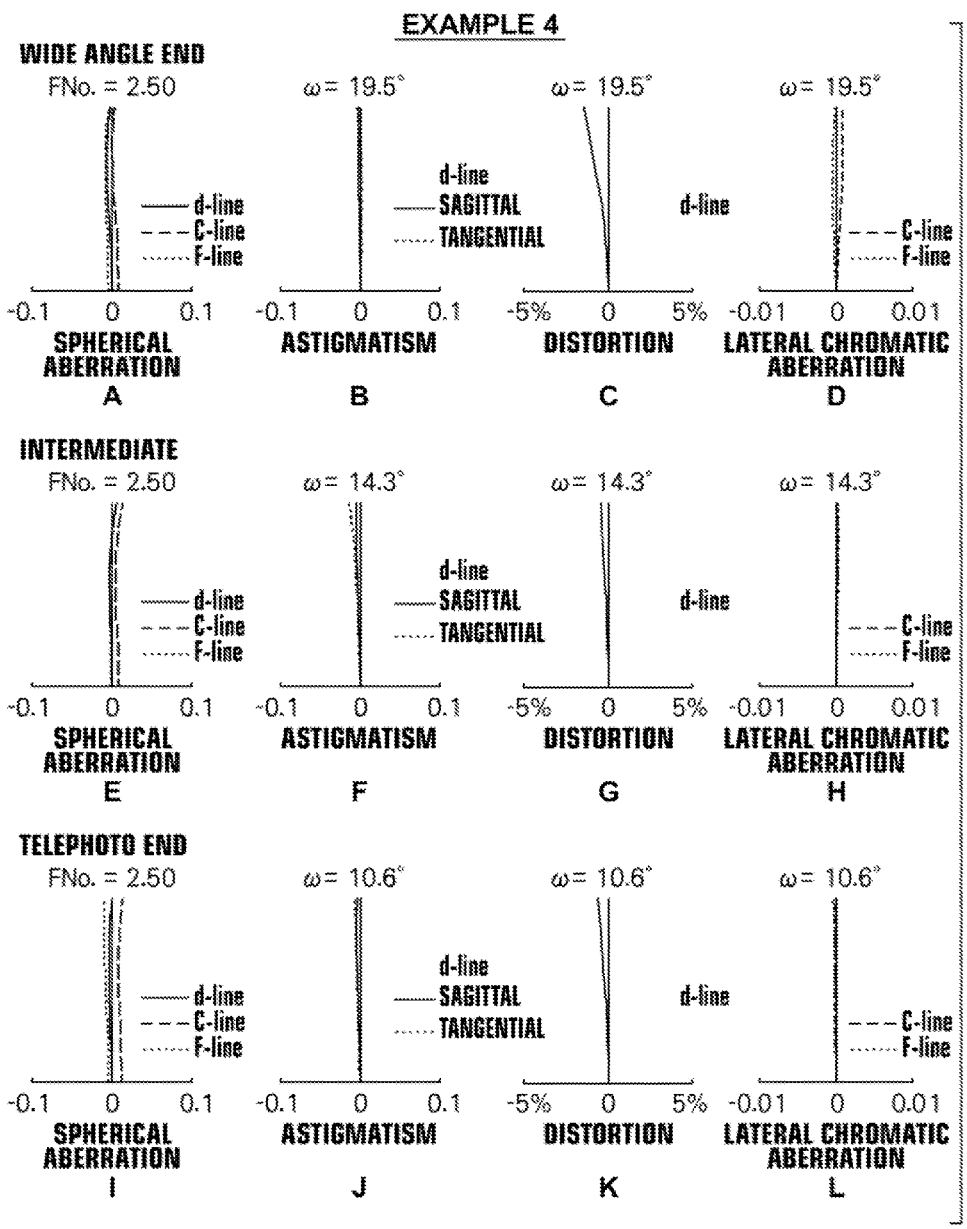
FIG. 8 shows aberration diagrams A through L of the projection zoom lens according to the above Example 4.

A through L of FIG. 8 respectively correspond to the aberration diagrams of the projection zoom lens of Example 4.

TABLE 9

| Conditional Formula | | Example 1 | Example 2 | Example 3 | Example 4 |
|---|---|---|---|---|---|
| (1) | mr/fw | 0.77 | 0.78 | 0.90 | 0.76 |
| (2) | fe/fw | 3.47 | 3.56 | 3.30 | 3.37 |
| (3) | mm/mr | −0.51 | −0.42 | −0.41 | −0.50 |
| (4) | Bf/Imϕ | 2.94 | 2.94 | 2.94 | 2.94 |
| (5) | L/Imϕ | 8.22 | 8.25 | 8.64 | 8.22 |
| (6) | f1/fw | 2.67 | 2.51 | 2.70 | 2.61 |
| (7) | Zr | 1.87 | 1.87 | 1.87 | 1.87 |

TABLE 10

| Conditional Formula | Example 1 | Example 2 | Example 3 | Example 4 |
|---|---|---|---|---|
| f2/fw | −1.18 | −1.05 | −1.21 | −1.15 |
| f3/fw | −9.36 | −10.11 | −10.11 | −9.42 |
| f4/fw | 3.19 | 3.25 | 3.53 | 3.31 |
| mm/fw | −0.39 | −0.33 | −0.37 | −0.38 |

The present invention has been described with reference to the Embodiments and Examples. The projection zoom lenses of the present invention are not limited to the Examples above, and various modifications are possible. For example, values, such as the radius of curvature, the distances between surfaces, the refractive indices, and the Abbe numbers of each lens element can be changed as appropriate.

Further, the projection type display device of the present invention is also not limited to the configuration described above. For example, the light valves to be utilized and optical members used for the beam separation or beam composition are not limited to the above configurations, and various modifications are possible.

What is claimed is:

1. A projection zoom lens consisting of:
a first lens group having a positive refractive power fixed while changing magnification, a second lens group having a negative refractive power that moves while changing magnifications, a third lens group having a negative refractive power that moves while changing magnification, a fourth lens group having a positive refractive power that moves while changing magnification, and a fifth lens group having a positive refractive power that is fixed while changing magnification in this order from the magnification side; and
an aperture stop positioned between adjacent moving lens groups or within one moving lens group, wherein
the numerical number of the zoom lens is set to be constant over the entire zoom range,
the reduction side is configured to be telecentric, and
the projection zoom lens satisfies conditional formulas (4) and (5):

$$2.0 < Bf/Im\phi \quad (4)$$

$$L/Im\phi < 12 \quad (5),$$

where,
Bf: the back focus, which is an air converted length, at the reduction side of the entire system at the wide angle end,
Imϕ: the maximum effective image circle diameter,
L: the distance between the most-magnification-side lens surface and the most-reduction-side lens surface along the optical axis when the projection distance is infinite.

2. The projection zoom lens of claim 1 that satisfies conditional formula (1) below:

$$0.3 < mr/fw \quad (1),$$

where,
mr: the amount of movement between the wide angle end and the telephoto end of the fourth lens group, and
fw: the focal length of the entire system at the wide angle end.

3. The projection zoom lens of claim 2 that satisfies conditional formula (1') below:

$$0.5 < mr/fw \quad (1').$$

4. The projection zoom lens of claim 1 that satisfies conditional formula (2) below:

$$2.0 < fe/fw < 7.0 \quad (2),$$

where,
fe: the focal length of the fifth lens group, and
fw: the focal length of the entire system at the wide angle end.

5. The projection zoom lens of claim 2 that satisfies conditional formula (2) below:

$$2.0 < fe/fw < 7.0 \quad (2),$$

where,
fe: the focal length of the fifth lens group, and
fw: the focal length of the entire system at the wide angle end.

6. The projection zoom lens of claim 4 that satisfies conditional formula (2') below:

$$3.0 < fe/fw < 5.0 \quad (2').$$

7. The projection zoom lens of claim 5 that satisfies conditional formula (2') below:

$$3.0 < fe/fw < 5.0 \quad (2').$$

8. The projection zoom lens of claim 1 that satisfies conditional formula (3) below:

$$-1.0 < mm/mr < -0.2 \quad (3),$$

where,
mm: the amount of movement between the wide angle end and the telephoto end of the second lens group, and
mr: the amount of movement between the wide angle end and the telephoto end of the fourth lens group.

9. The projection zoom lens of claim 2 that satisfies conditional formula (3) below:

$$-1.0 < mm/mr < -0.2 \quad (3),$$

where,
mm: the amount of movement between the wide angle end and the telephoto end of the second lens group, and
mr: the amount of movement between the wide angle end and the telephoto end of the fourth lens group.

10. The projection zoom lens of claim 8 that satisfies conditional formula (3') below:

$$-0.7 < mm/mr < -0.3 \quad (3').$$

11. The projection zoom lens of claim 9 that satisfies conditional formula (3') below:

$$-0.7 < mm/mr < -0.3 \quad (3').$$

12. The projection zoom lens of claim 1, wherein an aperture stop varies the aperture diameter thereof such that the numerical aperture is constant over the entire zoom range.

13. The projection zoom lens of claim 2, wherein an aperture stop varies the aperture diameter thereof such that the numerical aperture is constant over the entire zoom range.

14. The projection zoom lens of claim 1 that satisfies conditional formula (4') below:

$$2.5 < Bf/Im\phi \quad (4').$$

15. The projection zoom lens of claim 1 that satisfies conditional formula (5') below:

$$7 < L/Im\phi < 11 \quad (5').$$

16. The projection zoom lens of claim 1 that satisfies conditional formula (6) below:

$$1.0 < f1/fw < 5.0 \quad (6),$$

where,
f1: the focal length of the first lens group, and
fw: the focal length of the entire system at the wide angle end.

17. The projection zoom lens of claim 16 that satisfies conditional formula (6') below:

$$2.0 < f1/fw < 4.0 \quad (6').$$

18. The projection zoom lens of claim 1 that satisfies conditional formula (7) below:

$$1.4 < Zr \quad (7),$$

where,
Zr: the zoom ratio of the telephoto end with respect to the wide angle end.

19. The projection zoom lens of claim 18 that satisfies conditional formula (7') below:

$$1.6 < Zr \quad (7').$$

20. A projection type display device comprising:
a light source;
a light valve into which light from the light source enters; and
the projection zoom lens of claim 1 that projects an optical image formed by the light modulated by the light valve onto a screen.

* * * * *